United States Patent
Chang

(10) Patent No.: US 7,584,052 B2
(45) Date of Patent: Sep. 1, 2009

(54) METHOD OF DYNAMICALLY ADJUSTING VOICE SUGGESTED DISTANCE FOR GLOBAL POSITIONING SYSTEM

(75) Inventor: Jien-Yang Chang, Taoyuan County (TW)

(73) Assignee: Mitac International Corp., Taoyun (TW)

( * ) Notice: Subject to any disclaimer, the term of this patent is extended or adjusted under 35 U.S.C. 154(b) by 334 days.

(21) Appl. No.: 10/906,746

(22) Filed: Mar. 4, 2005

(65) Prior Publication Data

US 2005/0203703 A1  Sep. 15, 2005

(30) Foreign Application Priority Data

Mar. 10, 2004  (TW) ................. 93106284 A

(51) Int. Cl.
*G01S 1/00* (2006.01)
(52) U.S. Cl. .................. 701/213; 342/357.06
(58) Field of Classification Search ......... 701/200–202, 701/207, 208, 211, 213–215; 342/357.06, 342/357.08, 357.12; 340/988
See application file for complete search history.

(56) References Cited

U.S. PATENT DOCUMENTS

| 5,410,486 | A | 4/1995 | Kishi et al. ............ 364/449 |
| 5,612,882 | A | 3/1997 | LeFebvre et al. .......... 364/449.3 |
| 5,737,225 | A | 4/1998 | Schulte .................... 364/449.5 |
| 5,809,447 | A * | 9/1998 | Kato et al. ................. 701/211 |
| 6,061,628 | A * | 5/2000 | Hayashi et al. ............. 701/208 |
| 6,212,470 | B1 | 4/2001 | Seymour et al. ............ 701/207 |
| 6,278,943 | B1 | 8/2001 | Yamauchi .................... 701/211 |
| 6,801,159 | B2 * | 10/2004 | Swope et al. ........... 342/357.14 |
| 6,801,832 | B2 * | 10/2004 | Park et al. .................... 700/200 |
| 6,885,336 | B2 * | 4/2005 | Forrester ................. 342/357.1 |
| 6,892,135 | B1 * | 5/2005 | Krull et al. ................... 701/211 |
| 6,901,330 | B1 * | 5/2005 | Krull et al. ................... 701/211 |
| 6,941,220 | B2 * | 9/2005 | Le et al. ...................... 701/208 |
| 6,956,525 | B1 * | 10/2005 | Chang .................... 342/357.14 |
| 2006/0064240 | A1 * | 3/2006 | Wurth ........................ 701/201 |

FOREIGN PATENT DOCUMENTS

| EP | 0 836 074 A2 | 4/1998 |
| GB | 2 340 241 A | 2/2000 |

* cited by examiner

*Primary Examiner*—Yonel Beaulieu
(74) *Attorney, Agent, or Firm*—Jianq Chyun IP Office

(57) ABSTRACT

A method of dynamically adjusting a voice suggested distance for global positioning system (GPS) is provided. The method comprises receiving and decoding a GPS signal first by an electronic device, and then obtaining a speed parameter from the GPS signal. Then, a current driving speed is generated by calculating the obtained speed parameter, and a corresponding suggested distance is sought from a built-in table stored in the electronic device based on the current driving speed. Finally, the suggested distance is updated and registered temporarily. Accordingly, the present invention provides a more human GPS navigation function.

9 Claims, 4 Drawing Sheets

METHOD OF DYNAMICALLY ADJUSTING VOICE SUGGESTED DISTANCE FOR GLOBAL POSITIONING SYSTEM

CROSS-REFERENCE TO RELATED APPLICATION

This application claims the priority benefit of Taiwan application serial no. 93106284, filed on Mar. 10, 2004.

BACKGROUND OF THE INVENTION

1. Field of the Invention

The present invention relates to a method of providing voice suggested distance by a navigation software, and more particularly, to a method of dynamically adjusting a voice suggested distance for a global positioning system (GPS) navigation software based on a current driving speed.

2. Description of the Related Art

In 1973, the US Department of Defense started developing a precise satellite navigation and positioning project, called Global positioning system (GPS), which would cost over 12 billion US dollars. The project took more than 20 years. The first GPS satellite was launched in 1978, and 3D, all-weather positioning operation has been formally introduced since October 1993. Originally, the development of the GPS is only for supporting the military aviation and airplane requirements. Now, the GPS is opened to public usage, which inevitably brings a revolutionary change to our daily life. For example, for moving automobiles or ships, it is possible to obtain an accurate arrival time and an optimal trip route to the destination. The ambulance can perform the emergency mission with more efficiency. In addition, with the help of the electronic map, the car drivers can get a picture about the current location and the trip route to the destination. With accurate 3D positioning function, the GPS can be applied in the airplane navigation system in the airport control tower to prevent collisions, as well as the extremely precise zero-visibility landing system. In 1992, more than 130 GPS work items had been clearly defined by US Department of Forest Service based on its characteristics and its possible applications (Greer, 1993).

In general, a GPS configuration is composed of a space segment, a control segment, and a user segment.

The space segment represents the GPS satellites operating in the space. Although there are only 26 GPS satellites operating in the space now, only 24 satellites are actually required for receiving signals from 4~8 satellites anytime and anywhere simultaneously to perform the 3D positioning function, and the other two are spare satellites. The orbit period of all GPS satellites is 12 hours, which indicates the satellite circles the earth two rounds a day. Every GPS satellite has been installed 4 extremely precise atomic clocks for spare use, two of which are the Rubidium (Rb) atomic clocks, and the other two of which are the Cesium (Cs) atomic clocks. If the precision is measured by an error of one second, the precision of the Ru atomic clock is about 30K years, and the precision of the Cs atomic clock is about 300K years (Leick, 1990). The basic frequency of the atomic clock is 10.23 MHz, the multiples of which are used to form a C/A code (with a frequency of 1.023 MHz) and a PRN (Pseudo Random Noise) of a P code (with a frequency of 10.233 MHz). The codes mentioned above are modulated on a L1 carrier (with a frequency of 154*10.23 MHz and a wavelength of 19 cm) and a L2 carrier (with a frequency of 120*10.23 MHz and a wavelength of 24 cm), then the codes are finally modulated to a 50 BPS (bits per-second) dual-frequency radio signal broadcasting to the earth continuously. The reasons for modulating these codes on the carriers are: A. for obtaining a distance between the satellite and the receiver by measuring a time difference between the codes; B. for recognizing various types of satellites; C. for restraining the unauthorized use; and D. for eliminating impacts due to the non-geometrical factors.

The control segment of the GPS has been completed in September 1985. The control segment comprises a main control site, three ground antennas, and five monitor sites. Each monitor site comprises a dual-frequency GPS reception site, a standard atomic clock, a sensor, and a data processor. In addition, a WGS 84 coordination is provided through precise measurement by the US Department of Defense Cartography Service. Each monitor site is configured to continuously track each of the satellites 24 hours a day. In addition, an observed virtual distance obtained every 1.5 second, the observed weather data, and an ionization layer data are calculated together, so as to obtain a set of smoothed data every 15 minutes. Then, the smoothed data is transferred to the main control site. Located in the united space control center in Springfield, Colo., the main control site mainly receives various data transmitted from those five monitor sites, to calculate the satellite calendar data, the modification parameter of the satellite clock, and the modification parameters of the ionization layer delay for the ground antennas and then to the satellite in order to update the data in the satellite. The main control site is configured to calculate the modification of the satellite orbit, while sending the control signal, or replacing the malfunction satellite with the spare satellite. The ground antenna transmits the data to the satellite via an S-channel radio wave. A set of data is continuously sent back to the satellite every 8 hours under normal operation. The whole mission of the control segment is to keep the satellite operating in a precise orbit, to feed the update information back to the satellite, and to monitor each satellite for ensuring normal operation.

The user segment refers to a receiver which is used to receive the GPS satellite signal. Since the GPS is widely used in different applications, users may choose a receiver based on the required function and precision. For example, when it is applied to an application of measurement, at least a receiver, a recorder, a monitor, an embedded antenna or an external antenna, a data processor, such as Personal Digital Assistant (PDA) or a Personal Computer (PC), and a power supply are required.

Since more and more car manufacturers have made GPS a standard equipment, in the near future, drivers can better locate their position in a unfamiliar place without having to steer the wheel at one hand, and hold a map in the other hand trying to figure out the route to the destination. The GPS available in the market now provides a preset distance, before reaching a turn or a destination, regardless of the driving speed. That is, before coming to a turn or a destination, the system notifies the driver the left distance (suggested distance) before making a turn with a voice alarm. However, when driving at a high speed, the driver may miss the turn or destination because the suggested distance is too short, which is time wasting. Or when driving at the wrong lane, the driver needs to change the lanes suddenly, which may result in accidents in split second.

SUMMARY OF THE INVENTION

Therefore, it is an object of the present invention to provide a method of dynamically adjusting a voice suggested distance for GPS, wherein the suggested distance and voice alarm are dynamically adjusted by the navigation software based on the current driving speed, such that the navigation function provided by the GPS is more human.

The present invention provides a method for dynamically adjusting a voice suggested distance for GPS. The method comprises the following steps: receiving a GPS satellite signal by the electronic device, and decoding the GPS signal; obtaining a speed parameter from the decoded GPS satellite signal; obtaining a current driving speed, by calculating the speed parameter; searching a suggested distance corresponding to the current driving speed in a built-in table stored in the electronic device; and updating and registering the suggested distance.

In accordance with an embodiment of the present invention, the method mentioned above further comprises the step of: giving out either a voice alarm or a warning beep, when the car is within the suggested distance.

In accordance with an embodiment of the present invention, the step of receiving and decoding the GPS satellite signal comprises: receiving the GPS satellite signal by a GPS receiver installed in the electronic device; amplifying the GPS satellite signal; filtering a noise from the GPS satellite signal; and decoding the GPS satellite signal.

In accordance with an embodiment of the present invention, the suggested distance provided by the build-in table mentioned above is configured in the product line or is preset by the user.

In accordance with an embodiment of the present invention, the speed parameter mentioned above comprises a Recommended Minimum Specific (RMC) suggested by the GPS or a relative displacement direction and a Vector To Ground (VTG).

Since the present invention dynamically adjusts the voice suggested distance provided by the navigation software based on the current driving speed, the navigation function of the GPS is more human, and safe driving and path finding accuracy can be effectively improved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1:
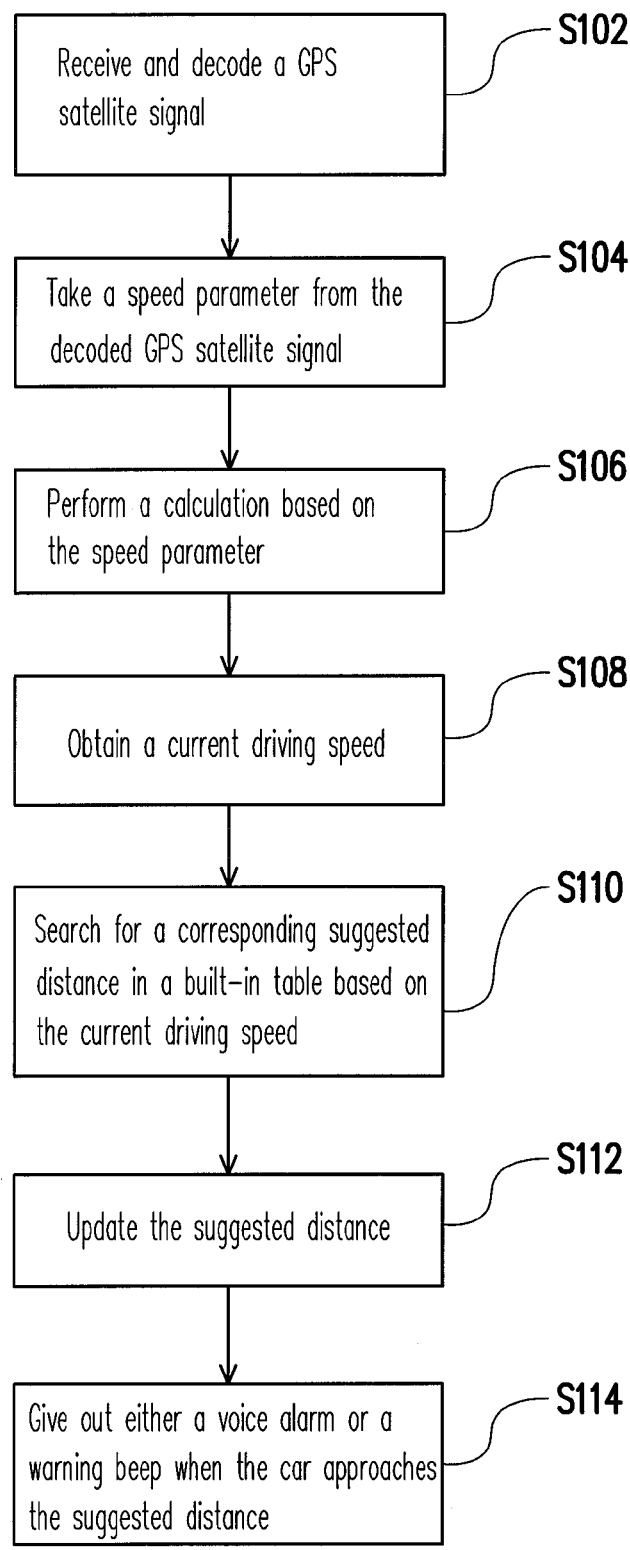
FIG. 1 schematically shows a flow chart illustrating a method of dynamically adjusting a voice suggested distance for GPS according to an embodiment of the present invention.

FIG. 1 schematically shows a flow chart illustrating a method of dynamically adjusting a voice suggested distance for GPS according to an embodiment of the present invention. The method is suitable for dynamically adjusting a suggested distance of a preset location based on the current driving speed. It will be apparent to one of the ordinary skilled in the art that the preset location mentioned above may be a turning point en route or a predetermined destination. However, it is not limited thereto. The electronic device may be a Personal Digital Assistant (PDA), a laptop (or notebook) computer, or any device supporting the navigation function.

In the present embodiment, when the car is moving, the GPS satellite signal transmitted from the GPS satellites is received by a GPS antenna installed in the car, and the received GPS satellite signal is then decoded by a circuit in the electronic device (s102).

Figures 2, 3:
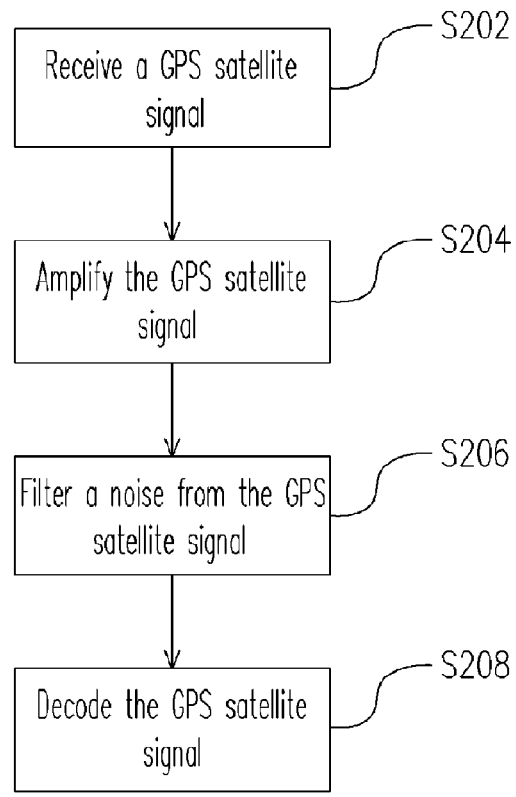
FIG. 2 schematically shows a flow chart illustrating a step of receiving and decoding a GPS satellite signal according to an embodiment of the present invention.
FIG. 3 schematically shows a built-in table of an electronic device according to an embodiment of the present invention.

As shown in FIG. 2, the step of receiving and decoding the GPS satellite signal by the electronic device comprises receiving a GPS satellite signal by the GPS antenna (s202). Then, the GPS satellite signal is amplified by the electronic device (s204). It will be apparent to one of the ordinary skilled in the art that the GPS satellite signal may be amplified by an Low Noise Amplifier (LNA) circuit in the electronic device. However, the present invention is not limited thereto.

The GPS satellite signal may be amplified to 27 dB by an LNA circuit.

After the GPS satellite signal has been amplified, a circuit inside the electronic device then filters noise of the GPS satellite signal (s206). It will be apparent to one of ordinary skilled in the art that the GPS satellite signal may be filtered by an active antenna filter inside the electronic device. Then, the filtered GPS satellite signal is decoded by a receiver inside the electronic device (s208).

Referring to FIG. 1, after receiving the decoded the GPS satellite signal, the electronic device then obtains a speed parameter therefrom (s104). It will be apparent to one of ordinary skilled in the art that the GPS satellite signal comprises a National Marine Electronics Association (NMEA) communication protocol data. Here, the NMEA is a US organization that defines a standard for the GPS receiver and a structure of data message, contents, and a protocol of the electronic equipment for the marine communication. The NMEA 0183 communication protocol is a standard data communication protocol currently used by the general GPS receiver and other navigation and marine electronic devices.

In the present embodiment, the speed parameter in the NMEA communication protocol data comprises a Recommended Minimum Specific (RMC) or a relative displacement direction and a Vector To Ground (VTG) suggested by the GPS.

In the present embodiment, after receiving the speed parameter, the electronic device then calculates the speed parameter (s106), and a current driving speed is obtained (s108). Then, the electronic device searches for a corresponding suggested distance from a built-in table stored in the electronic device based on the current driving speed (s110). FIG. 3 schematically shows a built-in table of an electronic device according to an embodiment of the present invention. The built-in table comprises a driving speed and a corresponding suggested distance. The suggested distance is configured in the production line or preset by the user, but is not limited thereto.

In the present embodiment, after the suggested distance corresponding to the current driving speed is obtained, the new suggested distance is temporarily stored in the electronic device (s112), in a read/write memory originally equipped in the electronic device, for example. When the car approaches the new suggested distance before the preset location, the electronic device gives out either a voice alarm or a warning beep (s114), so as to remind the driver of the distance from the preset location so the user has sufficient time to act accordingly (such as changing lanes or reducing speed, etc.).

In an embodiment of the present invention, most of the GPS receivers complies with a standard specification defined by National Marine Electronics Association (NMEA). The standard specification mentioned above defines the communication standard for all of the marine electronic equipment, including a format and a communication protocol for transmitting data. The NMEA specification mentioned above includes 0180, 0182, and 0183 three specifications. Since the third specification (NMEA-0183) includes RS-232 interface specification which is defined by NMEA-0180 and NMEA-0182, and also includes EIA-422, an industry standard interface, the 0180, 0182 specifications are almost replaced by the 0183 now. Moreover, EMEA-0183 can transmit more data than EMEA-0180 and EMEA-0182.

The data transmitted in an NMEA format are configured in American Standard Code for Information Interchange (ASCII) code. Here, the data is transmitted by sentences, and each sentence starts with "$" and ends with a decimal control code "10" and "13" (i.e. the Line Feed code and Carriage Return code defined in ASCII code). The length of the sentence is variable and up to 82 characters. The fields in the sentence are delimited by a comma ",". The 2nd and 3rd characters of the sentence represent an identification code of the transmitting equipment. For example, "GP" represents a GPS receiver, "LC" represents a Loran-C receiver, and "OM" represents an Omega Navigation receiver. The 4th, 5th, and 6th characters of the sentence represent a name of the sentence to be transmitted. For example, "GGA" represents a global positioning system fix data, and "RMC" represents a recommended minimum specific GPS/transit data. When the received NMEA communication protocol data is—$GPRMC,081243,A,2447.057,N,12059.862,E,000.1, 054.7,160796,020.3,E*68, "$GPRMC" is the recommended minimum specific GPS/transmit data, "0812436" indicates the data is transmitted at 08:12:43 GMT time, "A" indicates the receiver is active now, and "N" represents the receiver is in a standby status. In addition, "2447.057, N" represents it is on 24° 47.057' north latitude, and "12059.862,E" represents it is on 120° 59.862' east longitude. "000.1" represents a speed of 0.1 knot on the earth, "054.7" represents a signal strength, and "160796" indicates the data is transmitted on Jul. 16, 1996. In addition, "020.3, E" indicates the magnetic variation (declination) is 20.3° east, and "*68" represents a checksum.

In an embodiment of the present invention, the following format is a recommended basic format for representing a GNSS specification data:

$GPRMC,<1>,<2>,<3>,<4>,<5>,<6>,<7>,<8>,<9>,
<10>,<11><CR><LF>

<1> represents a Universal time coordinated (UTC) format of hhmmss.sss, <2> represents a positioning status in which "A" indicates the data is usable, and "V" indicates the data is unusable. In addition, <3> represents a latitude in a format of ddmm.mmmm, and <4> indicates whether it is in the northern hemisphere (N) or in the southern hemisphere (S). Similarly, <5> indicates a longitude with a format of ddmm.mmmm, and <6> indicates whether it is in the eastern hemisphere (E) or in the western hemisphere (W). Additionally, <7> represents a relative displacement speed from 0.0 to 1851.8 knots; <8> represents a relative displacement direction from 000.0 to 359.9 degrees, <9> represents a date in a format of ddmmyy, <10> represents a magnetic pole variation from 000.0 to 180.0, <11> represents a degree amount, and <12> represents a checksum.

In an embodiment of the present invention, the format for representing the relative displacement direction and Vector To Ground (VTG) is:

$GPVTG,<1>,T,<2>,M,<3>,N,<4>,K,<5><CR><LF>

Wherein, <1> represents a physical relative displacement direction from 000 to 359 degrees, <2> represents a pole relative displacement direction from 000 to 359 degrees, <3> represents a relative displacement speed from 00.0 to 999.9 knots, <4> represents a relative displacement speed from 00.0 to 1851.8 km/hr, and <5> represents a checksum.

Figure 4:
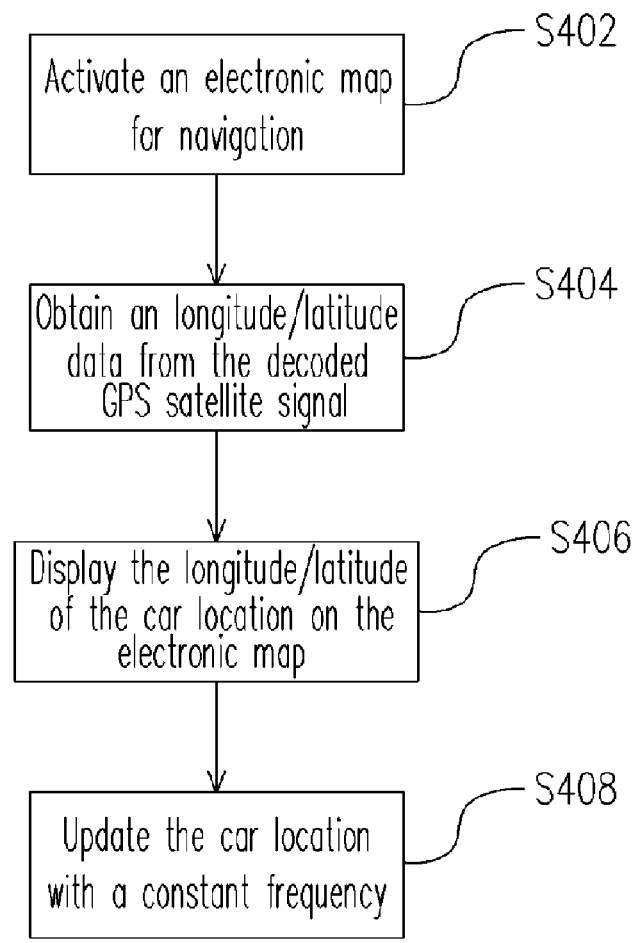
FIG. 4 schematically shows a flow chart illustrating a step of a GPS positioning function according to an embodiment of the present invention.

FIG. 4 schematically shows a flow chart illustrating a step of a GPS positioning function according to an embodiment of the present invention. In the present embodiment, before starting a car, the user would active the navigation software to track the current location in the electronic map (s402). Then, the electronic device (navigation device) receives a GPS satellite signal and decodes the received GPS satellite signal. Afterwards, the electronic device obtains a longitude/latitude data from the decoded GPS satellite signal (s404). The electronic device obtains the longitude/latitude data from the NMEA communication protocol data.

Then, the electronic device displays the longitude/latitude data indicating a current location of the car on the electronic map (s406). Wherein, it will be apparent to one of the ordinary skill in the art that the electronic device displays the longitude/latitude data on the electronic map with a small icon. The longitude/latitude data of the car's current location is continuously updated on the electronic map with a constant frequency when the car is moving (s408). Afterwards, when the car is moving, the voice suggested distance provided by the electronic device is dynamically adjusted to reduce the possibility of car accident by applying steps s104~s114 as shown in FIG. 1.

The positioning data is continuously sent out by the GPS satellite with a constant frequency of one data per second, and the longitude/latitude data is continuously updated by the electronic device with a constant frequency of one update per second.

Figure 5:
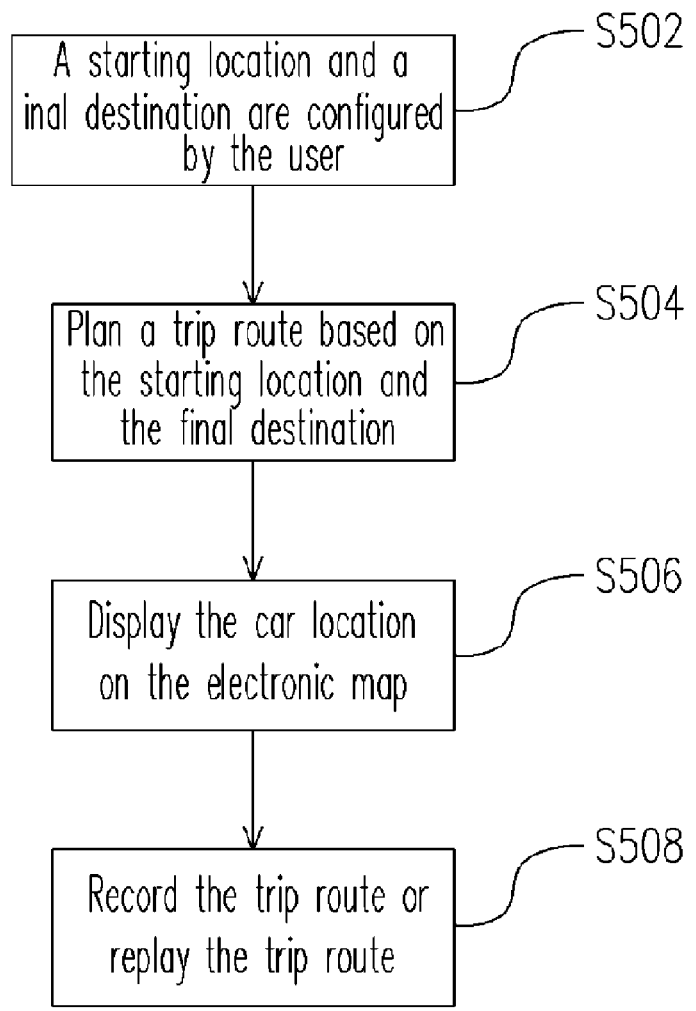
FIG. 5 schematically shows a flow chart illustrating a step of a GPS navigation function according to an embodiment of the present invention.

FIG. 5 schematically shows a flow chart illustrating a step of a GPS navigation function according to an embodiment of the present invention. In the present embodiment, when using the electronic device (navigation device) for the navigation function, the user first configures a starting location and a final destination (s520). Most of the starting locations are where the user is located when setting the configuration, however it is not limited thereto.

After the starting location and the final destination are configured, a shortest trip route is planned and displayed on the electronic map by the software installed in the electronic device based on the provided locations (s504). Then, the electronic device guides the user to move in a passive way following the planned route, and displays the longitude/latitude of the car on the electronic map based on the received GPS satellite signal (s506). The passive way means the user may follow the planned route or may use the planned route as a reference and steers the car in the user's own need.

In the present embodiment, the electronic device is able to record the trip route from the starting location to the final destination, or to continuously display the trip route from the starting location to the final destination (s508).

In an embodiment of the present invention, the electronic device is also able to remind the user of the turning point or notify the user when the car is deviated from the planned route with a voice alarm.

In summary, in the method of dynamically adjusting a voice suggested distance for GPS provided by the present invention, the navigation function provided by the GPS is more human, and safe driving and path finding accuracy are both effectively improved.

Although the invention has been described with reference to a particular embodiment thereof, it will be apparent to one of the ordinary skilled in the art that modifications to the described embodiment may be made without departing from the spirit of the invention. Accordingly, the scope of the invention will be defined by the attached claims not by the above detailed description.

What is claimed is:

1. A method of dynamically adjusting a voice suggested distance for global positioning system (GPS) suitable for adjusting a suggested distance to a preset location based on a current driving speed of a mobile device, the method comprising:
   receiving and decoding a GPS satellite signal;
   obtaining a speed parameter from the decoded GPS satellite signal;
   performing a calculation based on the speed parameter;
   obtaining the current driving speed;
   providing a built-in table with a relationship between a plurality of driving speeds and a plurality of distances stored therein;
   according to the relationship between the driving speeds and the distances stored in the built-in table, searching for the corresponding suggested distance among the distances based on the current driving speed;
   updating and registering the suggested distance; and
   making a sound of a voice suggested and/or a warning beep when the mobile device approaching the suggested distance.

2. The method of dynamically adjusting the voice suggested distance for GPS of claim 1, wherein the step of receiving and decoding the GPS satellite signal comprises:
   receiving the GPS satellite signal;
   amplifying the GPS satellite signal;
   filtering a noise from the GPS satellite signal; and
   decoding the filtered GPS satellite signal.

3. The method of dynamically adjusting the voice suggested distance for GPS of claim 1. wherein the suggested distance in the built-in table is preconfigured in a production line.

4. The method of dynamically adjusting the voice suggested distance for GPS of claim 1, wherein the suggested distance in the built-in table is configured by a user.

5. The method of dynamically adjusting the voice suggested distance for GPS of claim 1, wherein the speed parameter comprises a Recommended Minimum Specific (RMC) recommended by the GPS.

6. The method of dynamically adjusting the voice suggested distance for GPS of claim 1. wherein the speed parameter comprises a relative displacement direction and a Vector To Ground (VTG).

7. The method of dynamically adjusting the voice suggested distance for GPS of claim 1, wherein the GPS satellite signal comprises National Marine Electronics Association (NMEA) communication protocol data.

8. The method of dynamically adjusting the voice suggested distance for GPS of claim 1, wherein the preset location comprises a turning point en route.

9. The method of dynamically adjusting the voice suggested distance for GPS of claim 1, wherein the preset location comprises a destination.

* * * * *